US011155180B2

(12) United States Patent
Blaser et al.

(10) Patent No.: US 11,155,180 B2
(45) Date of Patent: Oct. 26, 2021

(54) VEHICLE-TO-BUILDING POWER SYSTEM

(71) Applicant: FORD GLOBAL TECHNOLOGIES, LLC, Dearborn, MI (US)

(72) Inventors: Rachel Blaser, New Hudson, MI (US); Thomas J. Coupar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 16/781,562

(22) Filed: Feb. 4, 2020

(65) Prior Publication Data

US 2021/0237612 A1 Aug. 5, 2021

(51) Int. Cl.
*B60L 55/00* (2019.01)
*H02J 3/32* (2006.01)
*H01M 10/44* (2006.01)

(52) U.S. Cl.
CPC ............. *B60L 55/00* (2019.02); *H01M 10/44* (2013.01); *H02J 3/32* (2013.01); *B60L 2210/40* (2013.01); *H01M 2220/20* (2013.01)

(58) Field of Classification Search
CPC .... B60L 55/00; B60L 2210/40; H01M 10/44; H01M 2220/20; H02J 3/32
See application file for complete search history.

(56) References Cited

U.S. PATENT DOCUMENTS

| | | | |
|---|---|---|---|
| 10,256,713 B2 * | 4/2019 | Fukuda | G01R 31/007 |
| 2015/0217656 A1 * | 8/2015 | Loftus | B60L 53/16 320/136 |
| 2016/0268917 A1 * | 9/2016 | Ramsay | H02M 1/14 |
| 2018/0022227 A1 | 1/2018 | Foldesi | |
| 2018/0037121 A1 * | 2/2018 | Narla | B60L 53/00 |

* cited by examiner

*Primary Examiner* — Alfonso Perez Borroto
*Assistant Examiner* — Joel Barnett
(74) *Attorney, Agent, or Firm* — David B Kelley; Brooks Kushman P.C.

(57) ABSTRACT

A vehicle-to-building power system allows a vehicle to power a building. The system includes a power-receiving unit remote from a vehicle. The unit includes a cable configured to mate with a vehicle port and support high-voltage electrical loads between the vehicle and the power-receiving unit. The unit further includes a high-voltage inverter configured to convert a direct current (DC) power supplied from a vehicle battery to an alternating current (AC) power compatible with a building electrical system, and a high-voltage DC bus electrically connected to the inverter. The bus has one or more contactors that electrically connect the cable to the high-voltage inverter when closed and electrically disconnect the cable and the high-voltage inverter when open.

19 Claims, 3 Drawing Sheets

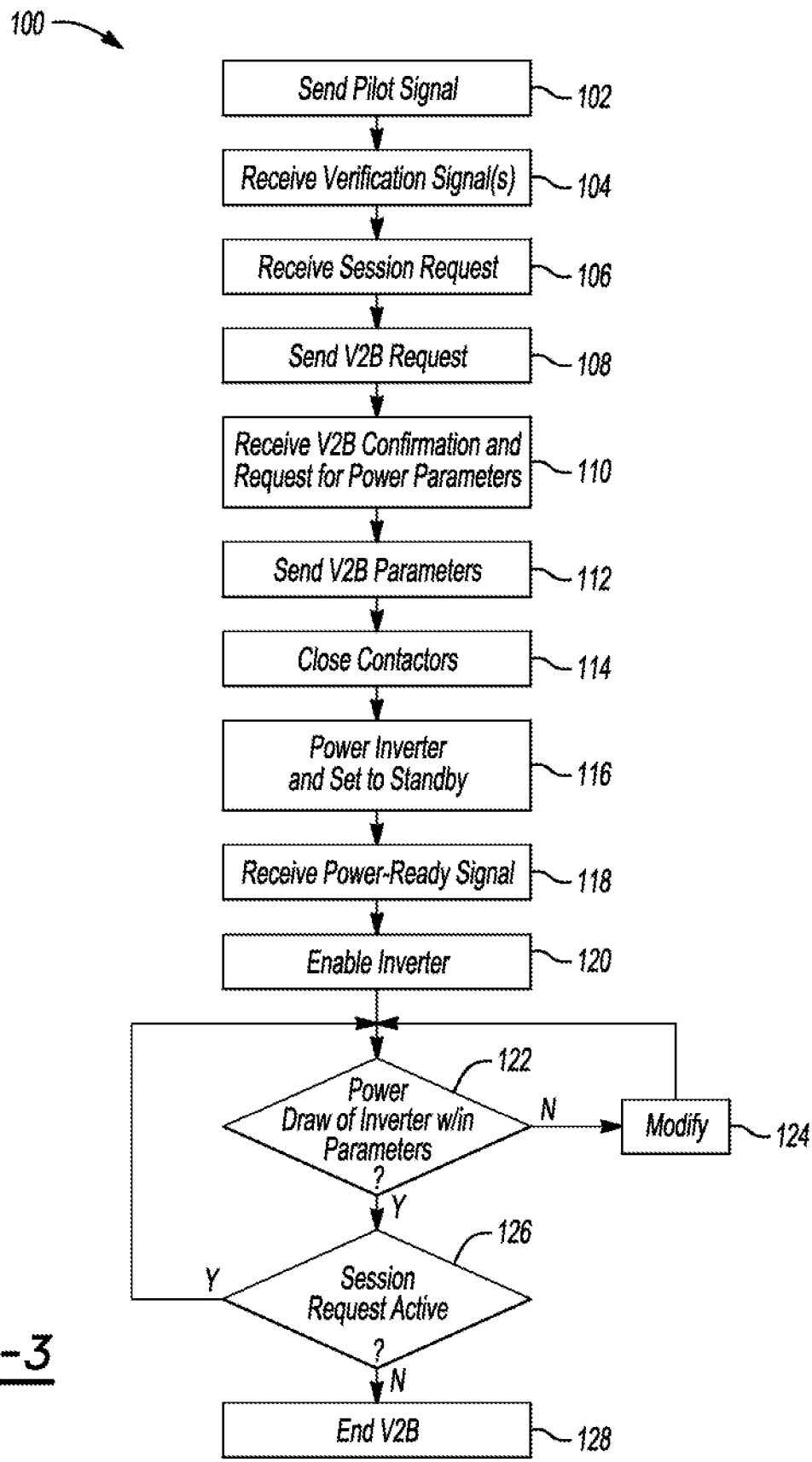

VEHICLE-TO-BUILDING POWER SYSTEM

TECHNICAL FIELD

This disclosure relates to electrified vehicles with capacity to act as a power source to power a building.

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle-to-building power system allows a vehicle to power a building. The system includes a power-receiving unit remote from a vehicle. The unit includes a cable configured to mate with a vehicle port and support high-voltage electrical loads between the vehicle and the power-receiving unit. The unit further includes a high-voltage inverter configured to convert a direct current (DC) power supplied from a vehicle battery to an alternating current (AC) power compatible with a building electrical system, and a high-voltage DC bus electrically connected to the inverter. The bus has one or more contactors that electrically connect the cable to the high-voltage inverter when closed and electrically disconnect the cable and the high-voltage inverter when open. A control module of the unit includes a controller, an AC power port configured to power the controller with AC power supplied by the building electrical system when power is available, a DC power port configured to power the controller with DC power supplied by an accessory power system of the vehicle when the power is unavailable, and a low-voltage inverter configured to convert AC power supplied by the AC power port to DC power compatible with the controller. The controller is configured to, in response to the cord being plugged into the vehicle port and the DC power port receiving power from the accessory power system of the vehicle, send a pilot control signal to the vehicle via the cable. The controller is further configured to, in response to receiving one or more verification signals from the vehicle that results from the vehicle receiving the pilot control signal, (i) close the one or more contactors and (ii) send a power-ready signal to the vehicle so that the building electrical system receives power from a vehicle battery once vehicle contactors are closed. The controller is also configured to de-energize the DC power port in response to power being received at the AC power port.

According to another embodiment, a method of powering a building with a vehicle includes sending a pilot control signal from a power-receiving unit associated with a building to a vehicle port via a cable in response to a direct current (DC) power port of the unit receiving power from an accessory electrical system of the vehicle. The method further includes, in response to the unit receiving one or more verification signals from the vehicle that results from the vehicle receiving the pilot control signal, (i) closing one or more contactors of the unit to electrically connect the cable to an inverter of the unit and (ii) sending a power-ready signal from the unit to the vehicle so that the unit is in condition to receive a DC power from the vehicle at the inverter. The method also includes conditioning, via the inverter, the DC power to an alternating current (AC) power compatible with an electrical system of the building, and de-energize the DC power port in response to an AC power port of the unit receiving the AC power from the electrical system of the building.

BRIEF DESCRIPTION OF THE DRAWINGS

FIG. 3 is a flow chart of a method for powering a building with the hybrid vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed. Used herein, "high voltage" refers to a voltage exceeding 50 volts. "Low voltage refers to voltages that are not high.

Figure 1:
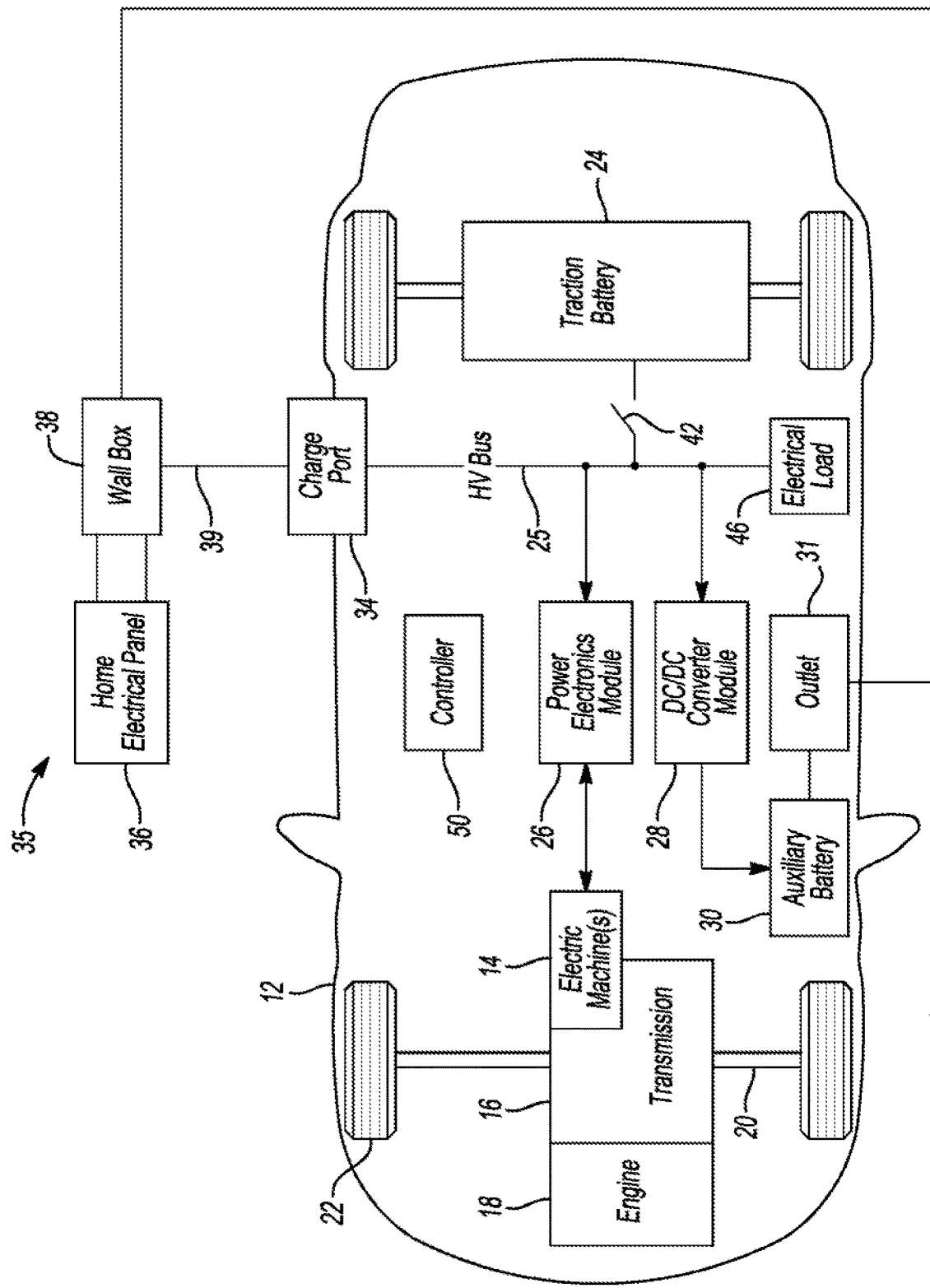
FIG. 1 is a schematic diagram of a plug-in hybrid vehicle.

FIG. 1 depicts a typical plug-in hybrid-electric vehicle (HEV) 12. The vehicle 12 may include one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and regenerative braking capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient conditions (engine speeds and loads) and allowing the hybrid-electric vehicle 12 to be operated in electric mode with the engine 18 off under certain conditions.

A traction battery or battery pack 24 stores energy that can be used by the electric machines 14. The traction battery 24 typically provides a high-voltage direct current (DC) output. The traction battery 24 is electrically connected to a high-voltage bus 25 by one or more contactors 42. The traction battery 24 may be constructed from a variety of chemical formulations such as lead acid, nickel-metal hydride (NIMH) or Lithium-Ion. The traction battery pack 24 may be in a series configuration of a number of battery cells. The battery packs may be composed of any number of individual battery cells connected in series or parallel or some combination thereof. A typical system may have one or more controllers, such as a Battery Energy Control Module (BECM) that monitors and controls the performance of the traction battery 24. The BECM may monitor several battery pack level characteristics such as pack current, pack voltage, and pack temperature. The BECM may have non-volatile memory so that data may be retained when the BECM is in an OFF condition. Retained data may be available upon the next ignition cycle. A battery management system may be comprised of the components other than the battery cells and may include the BECM, measurement sensors, and sensor modules. The function of the battery management system may be to operate the traction battery in a safe and efficient manner.

The one or more contactors 42 may isolate the traction battery 24 from other components, such as the bus 25, when opened and connect the traction battery 24 to other components including the bus 25 when closed. A power electronics module 26 is also electrically connected to the electric machines 14 and the bus 25 and provides the ability to bi-directionally transfer energy between the traction battery 24 and the electric machines 14. For example, a typical traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems connected to the high-voltage bus. The vehicle 12 may include a DC/DC converter module 28 that converts the high-voltage DC output of the traction battery 24 to a low-voltage DC supply that is compatible with other vehicle loads. Other high-voltage electrical loads 46, such as compressors and electric heaters, may be connected directly to the high-voltage without the use of a DC/DC converter module 28. The low-voltage system may include an auxiliary battery 30 (e.g., 12V battery) used to power the low-voltage system either alone or in combination with other components such as the D/DC converter and an alternator. The auxiliary battery 30 may power one or more DC outlets 31. The outlet 31 is configured to connect to a suitable power cord to power loads such as a cell phone charger and many others.

The vehicle 12 may be an electric vehicle or a plug-in hybrid vehicle in which the traction battery 24 may be recharged by an external power source such as a building electrical system connected to the power grid. For example, a building may include a charging system, sometimes called electric vehicle supply equipment (EVSE), that may include a cord configured to connect to a vehicle port 40. The vehicle port 40 includes terminals that connect with the cord to receive either AC or DC power from the charging system depending upon the type of charger. The vehicle port 40 may include both AC terminals and DC terminals, that is the vehicle port 40 may include receptacles connectable to both AC and DC cords. The vehicle may include a power conversion module (not shown) that conditions the power supplied from the charging system.

The vehicle includes one or more controllers 50 that may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. Reference herein to "a controller" means one of more controllers. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components. The controller 50 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller.

Charging an electrified vehicle with wall power is becoming increasingly common as these types of vehicles achieve greater market penetration. An underdeveloped concept is to use the vehicle to power a home or other building during a power outage or any other desired time. That is, stored energy in the traction battery is exported from the vehicle and used to power the building. This may be referred to vehicle-to-building (v2b) or vehicle-to-grid (v2g) or vehicle-to-home (v2h).

The vehicle 12 is configured to power a building that is equipped with a vehicle-to-building system. FIG. 1 illustrates an example vehicle-to-building system 35 that includes a wall box 38 mounted in an accessible area such as a garage. The wall box 38 contains power electronics electrically connected to the building electrical panel 36 by wiring. The wall box 38 has an associated cable 39 configured to connect to the vehicle port 40. In one embodiment, the system 35 is a DC system and the cable 39 is configured to connect to a DC charge receptacle of the port 34 so that the vehicle 12 can export DC power to the wall box 38 via the cable 39. The DC receptacle of the port 34 and the cable 39 may be according to one or more industrial standards.

Figure 2:
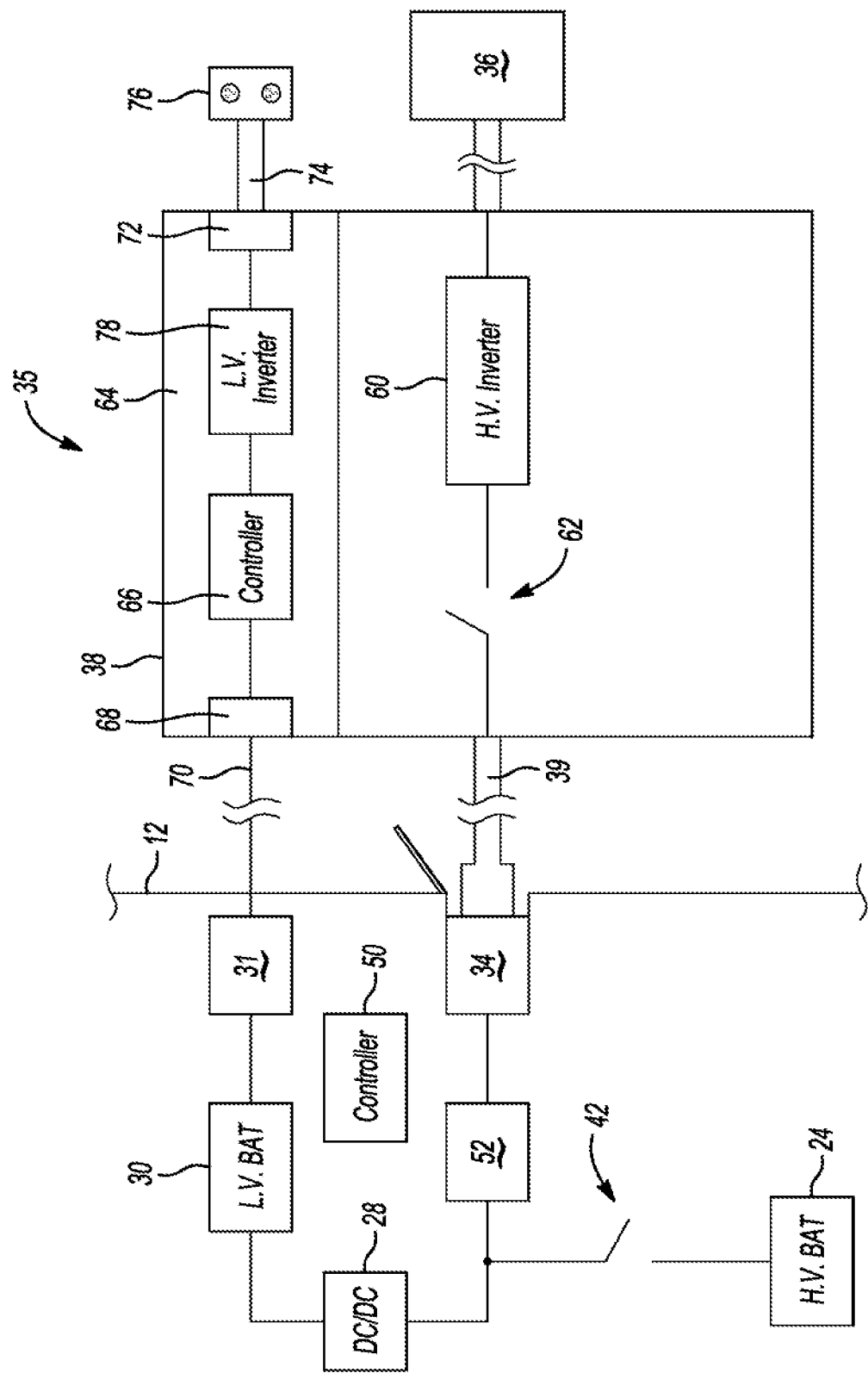
FIG. 2 is a schematic diagram of the hybrid vehicle connected to a vehicle-to-building power system.

FIG. 2 shows schematic diagram of the vehicle 12 connected to the vehicle-to-building power system 35. The wall box 38 includes a high-voltage inverter 60 configured to convert a DC power supplied from the traction battery 24 to an AC power that may be used to power the building. A high-voltage bus 61 electrically connects the cable 39 and the inverter 60. The bus 61 may include one or more contactors 62 configured to electrically connect the cable 39 to the inverter 60 when closed and electrically disconnect the cable 39 from the inverter 60 when open.

The wall box 38 includes a controller module 64 that controls operation of the vehicle-to-building power system 35. For example, the controller module 64 includes a controller 66 programmed to actuate the contactor(s) 62 and send and receive signals with the vehicle 12 to control the flow of power from the vehicle 12 to the system 35. The controller 66 may be configured to operate on 12 volts DC system (the actual voltage may range between 9-14 V, for example). This allows the controller 66 to be powered by the vehicle auxiliary power system when the building is without power. The control module 66 may include a low-voltage DC power port 68 that is located on a side of the wall box 38. The DC power port 68 is configured to electrically connect with an auxiliary outlet 31 on the vehicle via an auxiliary cord 70. The cord 70 may plug into a socket (receptacle) of the DC power port 68 or may be hardwired to the DC power port 68. For example, the cord 70 may include a first end that plugs into the vehicle outlet 31 and a second end that plugs into the receptacle of the DC power port 68. The control module 64 is also configured to power the controller 66 using AC power supplied by the building. For example, the control module 64 may include an AC power port 72 that receives power from the building. For example, the wall box 38 may include an associated AC power cord 74 configured to plug into an outlet 76 of the building. Alternatively, the wall box may be tied to the building. A low-voltage inverter 78 is configured to convert an AC power supplied from the building to a DC power compatible with the controller 66.

To power the building with the vehicle 12, a user plugs the cable 39 of the wall box 38 into the port 34 of the vehicle 12. If the building is without power, a user also plugs the cord 70 into the vehicle and into the wall box 38 (if necessary). The wall unit 38 now has power and a sequence for exporting vehicle power to the building can now commence and will be described below in conjunction with FIGS. 2 and 3 as an example embodiment.

Control logic or functions performed by controller 66 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 66. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

FIG. 3 is a flowchart 100 of a method for controlling the V2B power system 35. At operation 102, the controller 66 sends a pilot signal to the vehicle 12 over the cable 39. The cable 39 includes several wires one of which may be a dedicated pilot wire. The pilot signal is used to establish communication with the vehicle 12. The vehicle controller 50 may be programmed to perform a series of operations in response to receiving the pilot signal. For example, the vehicle may wake-up the appropriate vehicle subsystems in response to receiving the pilot signal. In some embodiments, the cable 39 and the port 34 may be configured with an automated locking system. The vehicle controller 50 may command the cord locked in response to receiving the pilot signal. The vehicle will also send one or more verification signals to the system 35. After sending the pilot signal at operation 102, the system 35 prepares to receive verification signals from the vehicle at operation 104. The verification signals received at operation 104 confirmed that the vehicle 12 successfully received the pilot signal and confirms a good connection between the cable 39 and the vehicle port 34. At operation 106, the controller 66 receives a session request from the vehicle 12. The session request is a communication in which the vehicle 12 asks the system 35 what type of event is about to occur, e.g., vehicle charging, V2B, etc. Upon receipt of the session request, the controller 66 sends a V2B request to the vehicle 12 at operation 108 to inform the vehicle that power is to be exported from the traction battery 24 to power the building. The vehicle may be programmed to receive the V2B request sent at operation 108 and set the mode to V2B and send a confirmation request that includes a request from parameters. In operation 110, the controller 66 receives the confirmation signal and the request for power parameters. At operation 112, the controller 66 sends the V2B parameters. These parameters may include, but are not limited to, the voltage, current, and power specifications allowed by either the vehicle battery or V2B. These specifications are based on the physical limitations of the system.

At operation 114, the controller 66 commands the contactor(s) 62 to close. This electrically connects the cable 39 to the high-voltage inverter 60. At this point, the building is still disconnected from the vehicle as the inverter 60 is deenergized and the contactors 42 of the vehicle are still open. At operation 116, the inverter 60 is powered on and placed in standby. Meanwhile, the vehicle is preparing to close the contactors 42. The vehicle may begin the process of closing the contactors 42 in response to receiving the parameters sent at operation 112. Prior to closing the contactors 42, the vehicle may pre-charge the high-voltage bus to prevent contactor damage during closing. The contactors 42 are closed once pre-charging is confirmed by either vehicle sensors or sensors of the V2B system. The vehicle 12 sends a power-ready signal after the contactors 42 are closed. The vehicle receives the power-ready signal at operation 118, and in response, enables the inverter 60 at operation 120. Enabling the inverter 60 at operation 120 results in high-voltage DC power flowing from the traction battery 24 to the wall unit 38. The controllers 66 and 50 include programming that regulate the flow of power during V2B by adjusting the voltage of the inverter in the wall unit.

For example, the controller 66 may monitor the power draw of the inverter 60 and determine if the power draw is within the parameters. In the event that the controller 66 determines that power draw is outside of the bounds that have been defined, the controller 66 can send an error signal to vehicle system which can subsequently cause the vehicle to open high-voltage contactors and terminate the connection. The controller 66 may monitor various parameters such as current, voltage, isolation resistance, or temperatures within the inverter to determine whether or not there is a reason to terminate the connection If the power draws within the parameters, control passes to operation 126, and the controller 66 determines if the session request is still active. If no, V2B ends. Explain how V2B is terminated. V2B power transfer may end under different conditions. For example, the user may elect to terminate V2B, allowing them to unplug the connector once contactors on the vehicle have opened and the system has determined that the bus voltage is low enough to allow for the cable connecting the V2B to the vehicle to be removed. V2B may terminate when either the vehicle controller or the V2B controller detects a fault state. A user may also use either a phone app, or other HMI with the V2B to schedule, or set allowable times for V2B power transfer when the cable is connected. A user may also employ the use of software to determine optimal times for V2B operation, which could be based on factors such as hourly dollar/kWh rates set by the local energy company. During V2B termination, high voltage is isolated within the vehicle before allowing the cord to be removed. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle-to-building power system that allows a vehicle to power a building, the system comprising:
    a power-receiving unit remote from a vehicle, the unit including:
        a cable configured to mate with a vehicle port and support high-voltage electrical loads between the vehicle and the power-receiving unit;
        a high-voltage inverter configured to convert a direct current (DC) power supplied from a vehicle battery to an alternating current (AC) power compatible with a building electrical system;
        a high-voltage DC bus electrically connected to the inverter, the bus including one or more contactors that electrically connect the cable to the high-voltage inverter when closed and electrically disconnect the cable and the high-voltage inverter when open; and
        a control module including a controller, an AC power port configured to power the controller with AC power supplied by the building electrical system when power is available, a DC power port configured to power the controller with DC power supplied by an accessory power system of the vehicle when the power is unavailable, and a low-voltage inverter configured to convert AC power supplied by the AC power port to DC power compatible with the controller, wherein the controller is configured to
            in response to the cable being plugged into the vehicle port and the DC power port receiving power from the accessory power system of the vehicle, send a pilot control signal to the vehicle via the cable,
            in response to receiving one or more verification signals from the vehicle that results from the vehicle receiving the pilot control signal, (i) close the one or more contactors and (ii) send a power-ready signal to the vehicle so that the building electrical system receives power from a vehicle battery once vehicle contactors are closed, and
            de-energize the DC power port in response to power being received at the AC power port.

2. The system of claim 1, wherein the controller is further configured to, in response to receiving the one or more verification signals and receiving a request for parameters from the vehicle, send the parameters to the vehicle.

3. The system of claim 1, wherein the controller is further configured to, in response to the one or more contactors closing, energizing the inverter.

4. The system of claim 1, wherein the controller is further configured to:
    monitor power draw of the high-voltage inverter, and operate the high-voltage inverter to maintain the power draw according to parameters received from the vehicle.

5. The system of claim 1, wherein the unit is adapted to be mounted on the building.

6. The system of claim 5, wherein the DC power port is located in a sidewall of the unit.

7. The system of claim 1 further comprising a DC power cord having a first end configured to mate with the DC power port and a second end configured to mate with an outlet of the accessory power system of the vehicle.

8. The system of claim 7, wherein the DC power port includes a receptacle, and the first end includes a plug that is receivable in the receptacle.

9. A vehicle-to-building power system that allows a vehicle to power a building, the system comprising:
  a housing;
  a high-voltage inverter disposed in the housing and configured to convert a direct current (DC) power supplied from a vehicle battery to an alternating current (AC) power compatible with a building electrical system;
  a cable connected to the housing and configured to mate with a vehicle port;
  a high-voltage DC bus electrically connected to the inverter, the bus including one or more contactors that electrically connect the cable to the high-voltage inverter when closed and electrically disconnect the cable and the high-voltage inverter when open; and
  a control module including a controller, an AC power port configured to power the controller with AC power supplied by the building electrical system when wall power is available, a DC power port configured to power the controller with DC power supplied by an accessory power system of the vehicle when the wall power is unavailable, wherein the controller is configured to
    in response to the cable being plugged into the vehicle port, send a pilot control signal to the vehicle via the cable, and
    in response to receiving one or more verification signals from the vehicle that results from the vehicle receiving the pilot control signal, close the one or more contactors.

10. The system of claim 9, wherein the controller is further configured to de-energize the DC power port in response to power being received at the AC power port.

11. The system of claim 9, wherein and the control module further includes a low-voltage inverter configured to convert AC power supplied by the AC power port to DC power compatible with the controller.

12. The system of claim 9 further comprising a DC power cord having a first end configured to mate with the DC power port and a second end configured to mate with an outlet of the accessory power system of the vehicle.

13. The system of claim 9, wherein the high-voltage DC bus is disposed in the housing.

14. The system of claim 9, wherein the pilot control signal is further in response to the DC power port receiving power from the accessory power system of the vehicle.

15. The system of claim 9, wherein the housing is adapted to be mounted to the building.

16. The system of claim 9, wherein the DC power port is located in a sidewall of the housing.

17. The system of claim 9, wherein the controller is further configured to:
  monitor power draw of the high-voltage inverter, and
  operate the high-voltage inverter to maintain the power drawing according parameters received from the vehicle.

18. A method of powering a building with a vehicle, the method comprising:
  sending a pilot control signal from a power-receiving unit associated with a building to a vehicle port via a cable in response to a direct current (DC) power port of the unit receiving power from an accessory electrical system of the vehicle;
  in response to the unit receiving one or more verification signals from the vehicle that results from the vehicle receiving the pilot control signal, (i) closing one or more contactors of the unit to electrically connect the cable to an inverter of the unit and (ii) sending a power-ready signal from the unit to the vehicle so that the unit is in condition to receive a DC power from the vehicle at the inverter;
  conditioning, via the inverter, the DC power to an alternating current (AC) power compatible with an electrical system of the building; and
  de-energize the DC power port in response to an AC power port of the unit receiving the AC power from the electrical system of the building.

19. The method of claim 18 further comprising connecting a low-voltage cord between an outlet of the accessory electrical system of the vehicle and the DC power port of the unit.

* * * * *